March 26, 1974　　C. G. GILMORE　　3,799,835

ANTI-CREASE FRICTION WELD STRAPPING TOOL

Filed July 24, 1972　　6 Sheets-Sheet 1

March 26, 1974  C. G. GILMORE  3,799,835
ANTI-CREASE FRICTION WELD STRAPPING TOOL
Filed July 24, 1972  6 Sheets-Sheet 2

3,799,835
ANTI-CREASE FRICTION WELD STRAPPING TOOL
Charles G. Gilmore, Wilmington, Del., assignor to
FMC Corporation, San Jose, Calif.
Filed July 24, 1972, Ser. No. 274,776
Int. Cl. B23k 27/00
U.S. Cl. 156—580                                  2 Claims

ABSTRACT OF THE DISCLOSURE

A hand tool for joining thermoplastic strapping about an article has a strap tensioning wheel, a manually operated tension plate cooperating with the wheel, oscillating and fixed welding jaws, and an air motor for driving both the tension wheel and one of the jaws. A clutch is provided for disconnecting the motor drive from the tension wheel although the motor always remains connected to the oscillating jaws. A manual release lever releases the tension plate from the tension wheel, and a weld lever is manually operated for closing the welding jaws and declutching the motor from the strap tensioning wheel, whereupon the motor oscillates the welding jaw to make the joint. A cam is mounted on the weld lever and positioned to engage and operate the release lever to retract the tension plate after the weld jaws have been closed on the strap. This eliminates crease failure of the strap between the weld jaws and the tensioning assembly during the friction weld oscillation.

FIELD OF THE INVENTION

This invention relates generally to adhesive bonding and more particularly to a tool for friction welding the ends of thermoplastic strapping about an article.

DESCRIPTION OF PRIOR ART

This patent represents an improvement over U.S. Vilcins Pat. 3,442,733, May 16, 1969. The Vilcins patent shows an air motor driven strap welding tool wherein the strap is threaded between a tension wheel and a spring closed tension plate, the latter being opened by a manual release lever. After the strap is threaded, the tension plate grips the strap against the tension wheel and the air motor is started, to drive the wheel tension and pull the strap tightly about an article. The motor thereupon stalls. A weld lever is then manually operated to bring an oscillatory welding jaw towards a fixed jaw, and in addition, a clutch between the motor an the tension wheel is released and a brake is applied to the tensioning wheel thereby allowing the motor, which was formerly stalled, to begin rotating again. This begins oscillation of the welding jaw and further activation of the weld lever firmly presses the welding jaw against the fixed jaw so that the continued rotation of the motor and oscillation of the jaw provides a thermoplastic weld joint between the ends of the strap.

Although the aforesaid hand tool performs satisfactorily on certain types of strap material such as nylon, (for example) the tool is not commercially acceptable for joining other plastic straps such as those formed of polypropylene. An unacceptably large percentage of polypropylene joints formed with the aforesaid tool of the Vilcins patent suffer from what will be termed "crease breakage" that occurs between the tension wheel and plate, and the closed tension and the oscillating welding jaw. Crease breakage is believed to occur because both the tension wheel and the tension plate cooperate to grip the strap at a location close to the welding jaws, so that longitudinal reciprocation of the welding jaw causes rapid flexure of a relatively short, confined length of strap. It is also noted that the mode of operation of the Vilcins tool, which causes crease breakage, also isolates the ends of the strap that are being friction fused from the tension in the strap about the article, and therefore a tension-welded joint is not otbained.

The U.S. patent to Brenneisen 3,586,590, June 26, 1971, shows a hand tool for friction welding strapping, wherein the welding jaws are oscillated by a motor and the tensioning wheel is manually turned by a ratchet mechanism which exerts a clamping force against the strapping during the welding operation.

The U.S. patent to Stensaker 3,442,735, May 6, 1969 discloses release of the tensioning assembly during the welding operation. However, the welding operation is performed by imparting a rapid one way stroke to a gripped end of the strap relative to a pair of closed, non-oscillating welding jaws.

SUMMARY OF THE INVENTION

The hand tool of the present invention, like that of the aforesaid Vilcins Pat. 3,442,733, is a hand operated tool for joining thermoplastic strapping, the power being supplied by an air motor. The overlapped strapping elements are initially fed between the welding jaws and between the tension plate and wheel assembly, which assembly is normally closed to grip the strapping but which can be manually opened by a release lever. The air motor is always connected to mechanism for oscillating one of the welding jaws and is connected to the drive for the strap tensioning wheel through a clutch. As in Vilcins, a weld lever has the dual function of first closing the welding jaws and then disengaging the clutch between the motor and the tension wheel, which also brakes the tension wheel.

The basic mode of operation, is to manually depress the release lever and thus retract the spring closed tension plate from the wheel. The weld lever will have been manually pushed forward, which opens the weld jaws and clutches the tension wheel to the air motor. After the strap ends have been threaded between the welding jaws and the tensioning mechanism, the air motor is started. When the air motor is started the tension wheel is driven to tighten the strap about the article. When the strap is tight the air motor stalls. When this occurs, the weld lever is pulled backwards, closing the welding jaws and disengaging the clutch to the tension wheel, whereupon the air motor can resume rotation and oscillate one of the welding jaws to form the weld in the strap ends. As previously mentioned, the oscillation of the welded jaw flexes a short double length of strap between the welding jaws and the tensioning mechanism and has caused crease failure. In accordane with the present invention a release cam is mounted on the weld lever in such a position that after the strap has been tensioned and the weld lever has been moved back to initially close the welding jaws and disengage the clutch so that welding can start, the release cam automatically engages the release lever that controls the tension plate. This retracts the tension plate from its spring loaded position against the tension wheel. Thus, when the weld lever releases the clutch and permits the previously stalled air motor to rotate and oscillate the welding jaw, the strap will not be gripped by the tensioning mechanism. As a result of this action of the release cam of the present invention, there is no short length of strap trapped closely adjacent to the oscillating weding jaw and hence there is no crease breakage of the strap by strap flexure. All this action occurs without requiring judgment on the part of the operator. In other words, after the strap has been fed into the machine and tensioned by the air motor, the operator merely pulls back on the weld lever and the welding takes place in the manner described above and without failure of the strap by crease breakage due to flexing of trapped portions thereof. Crease breakage has been found to present a particularly severe problem with polypropylene strapping, but the principles and advantages of the present invention will apply to any thermoplastic strapping which can be welded.

GENERAL DESCRIPTION

The basic elements of a hand tool embodying the present invention will be mentioned briefly in connection with FIGS. 1–6. The tool, indicated generally at 10, has a combined main frame and housing 12 and projecting from the rear of the housing is an air motor 14 connected at 15 to a source of compressed air and controlled by a manual valve 16, seen in FIG 1. The tool is held by means of the motor by one hand and as will be seen, the other hand operates the manual levers.

Figure 1:
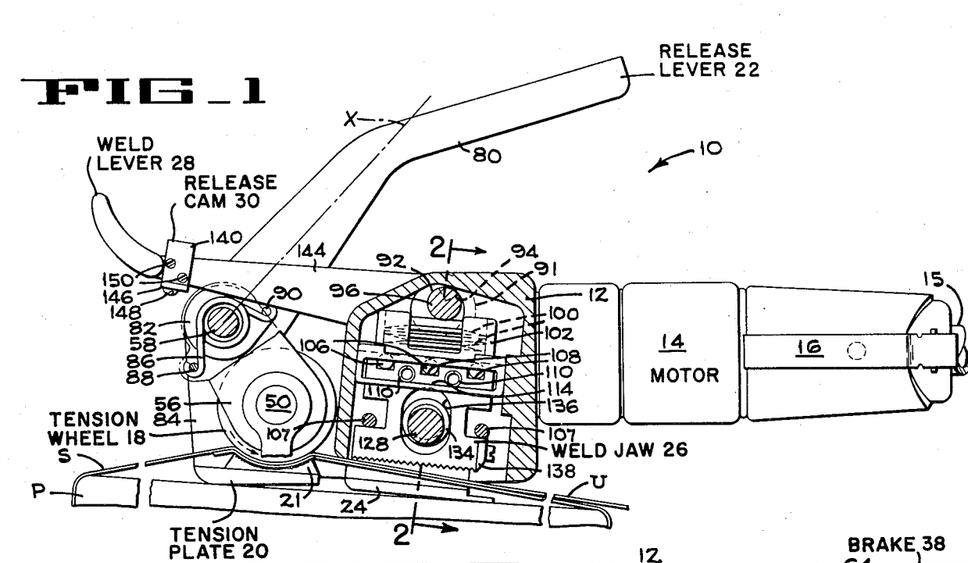
FIG. 1 is a side view of the apparatus with parts broken away showing operation during the strap tensioning cycle.

In order to tension the plastic strap S about an article P, a power driven tension wheel 18 is provided in accordance with known principles and this wheel cooperates with an opposed tension plate or anvil 20. The plate or anvil 20 is spring urged against the tension wheel 18 and the plate is manually retracted by a manual release lever 22 for introduction of the overlapped strap portions between the wheel and the anvil. Just behind the tension wheel and tension plate assembly is a fixed welding jaw 24 opposed by an oscillatable welding jaw 26, the latter being serrated for gripping and sliding the two overlapped portions relative to one another to form a friction-fused joint. The weld jaw 26 is brought into compressive engagement with the overlapped strap portions by manual operation of a weld lever 28. Thus far the tool does not differ from that of the aforesaid Vilcins patent, but in accordance with the present invention and as will be described in detail, a release cam 30 is secured to the weld lever 28 so that when the weld lever is retracted to compress the joint and initiate oscillation of the weld jaw 26, the release lever 22 is automatically pulled back to retract the tension plate 20 from the tension wheel 18, thereby freeing the strap portions at the tension mechanism. Before describing the principles of the operation of the present invention more specifically, and in the interests of completeness, the various details of the tool construction will be explained in conjunction with the drawings.

Tension wheel drive

After the overlapped strap portions have been placed between the tension wheel 18 and the tension plate 10, the valve 16 for the air motor 14 is operated by the hand that is holding the air motor, in order to cause rotation of the tension wheel. The motor drives the tension wheel in a manner which first draws up the strap portions to tension them about the article and then the motor stalls, indicating the tensioning has been completed. As will be seen, a clutch and brake assembly is incorporated into the drive between the motor and the tension wheel, for disconnecting the wheel from the stalled motor and for braking the wheel to hold the strap in tension before the weld jaws are closed.

Figures 2, 3:
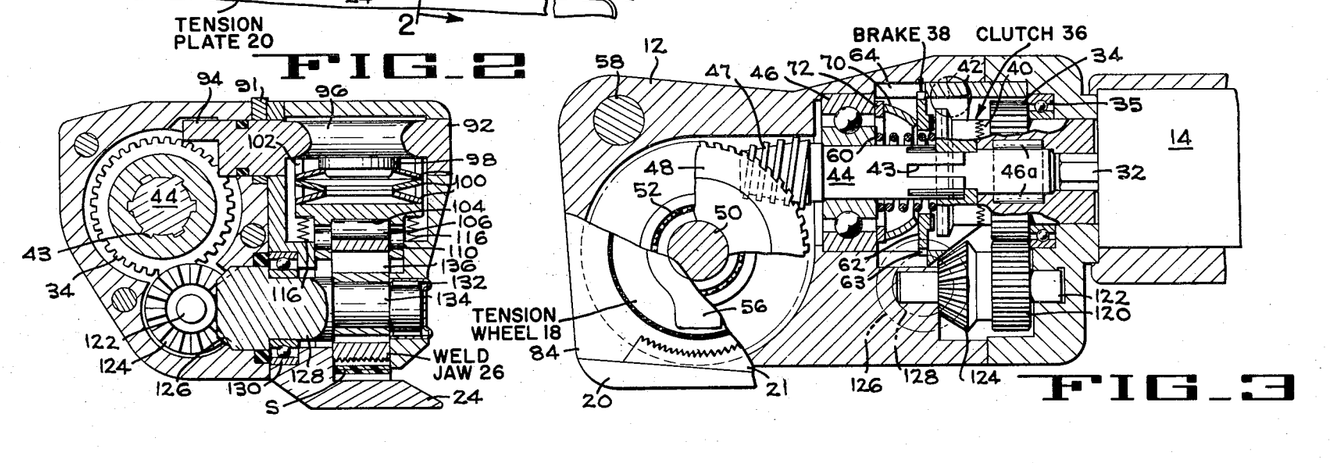
FIG. 2 is a section taken on line 2—2 of FIG. 1.
FIG. 3 is a section taken on line 3—3 of FIG. 5.
Figure 4:
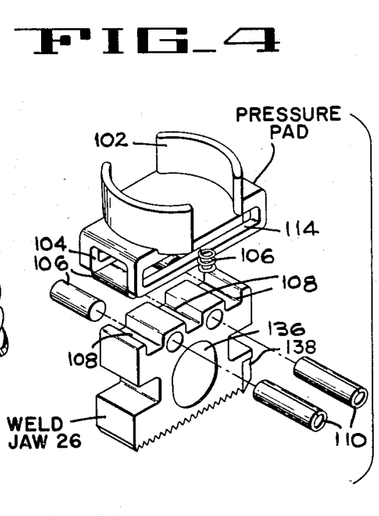
FIG. 4 is an exploded perspective of the pressure pad and welding jaw assembly.
Figures 7, 8:
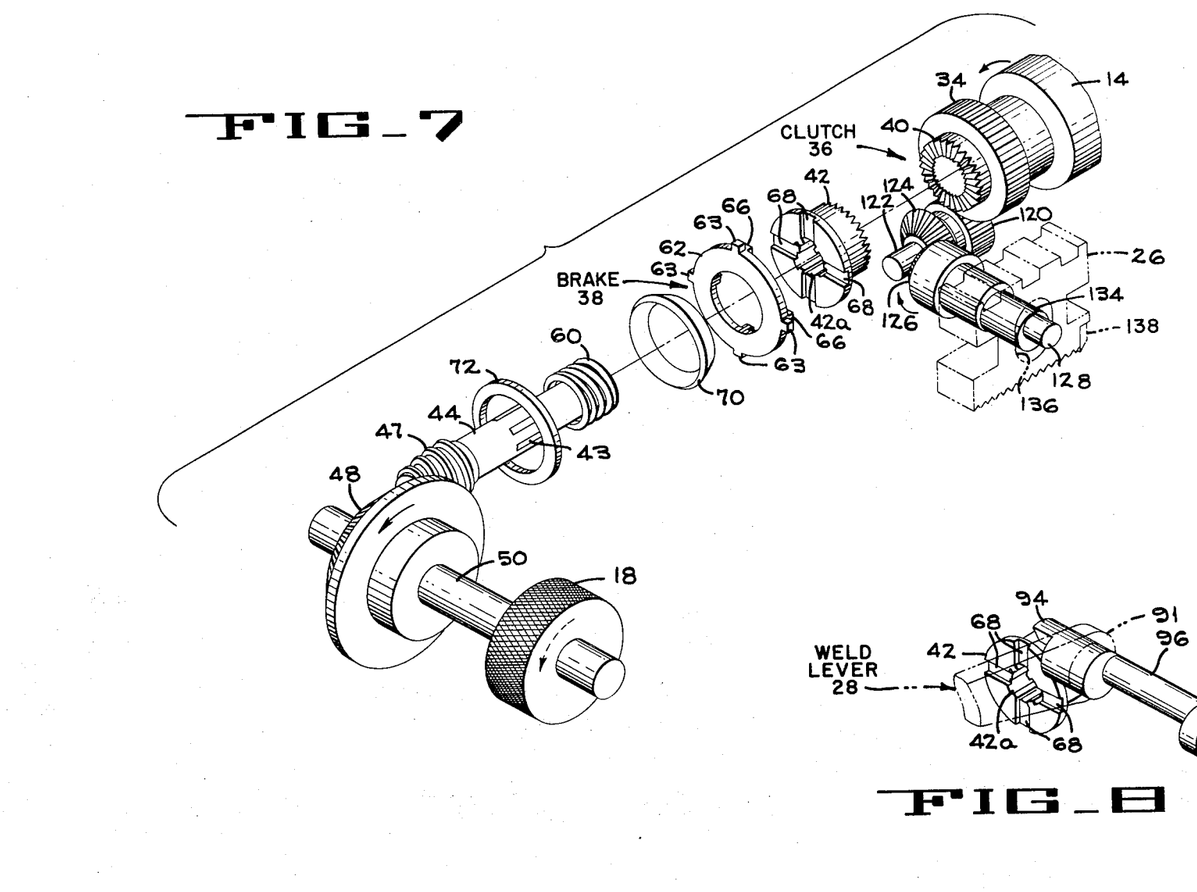
FIG. 7 is an exploded perspective of the clutch and drive mechanism for the welding jaw and the tension wheel.
FIG. 8 is a fragmentary perspective showing the pivot shaft for the weld lever and the clutch shifting cam thereon.

Referring to FIGS. 3 and 7, the shaft 32 of the motor 14 (FIG. 3) is splined to a main drive gear 34 mounted in bearings 35 in the housing 12. A clutch, indicated generally at 36 and a brake indicated generally at 38, are in the drive train to the tension wheel 18.

Figure 5:
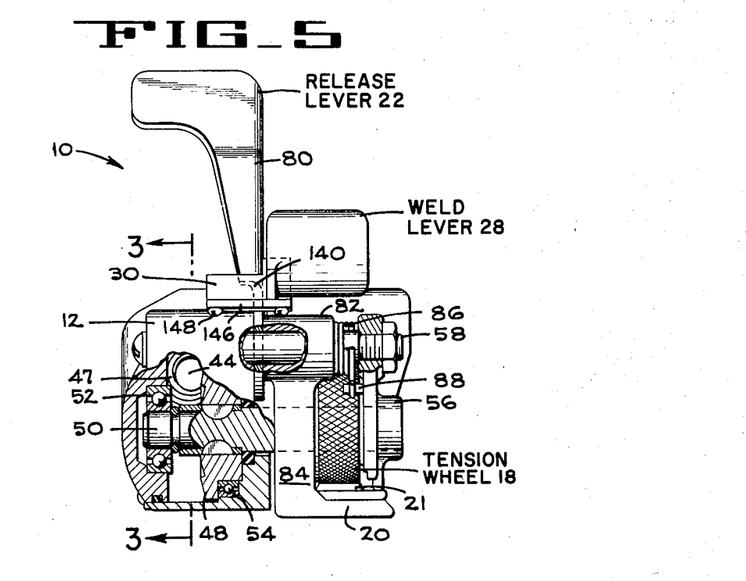
FIG. 5 is a front elevation of the tool with parts broken away.

The clutch 36 includes a toothed driving member 40 integral with the motor gear 34 and an opposed toothed driven member 42 that is internally splined at 42a (FIG. 7) and slidably splined at 43 to the drive shaft 44 for the tension wheel. The drive shaft 44 is mounted at its forward end in bearings 46 (FIG. 3) in the housing 12 and the inner end thereof is piloted in needle bearings 46a in a bore formed in the main drive gear 34. The forward end of the drive shaft 44 is formed with a hypoid worm or pinion 47 which is matched with a gear 48 formed on the shaft 50 for the tension wheel 18 (FIG. 7). As seen in FIG. 5, the outer end of the tension wheel shaft 50 is mounted in the housing 12 by means of bearings 52, and the gear 48, which is keyed to the shaft 50, is mounted in the housing by bearings 54. The outer end of the shaft 50 receives additional support from an outboard bearing member 56 (FIGS. 1 and 5) which depends from and is secured to a shaft 58 that also forms a pivot shaft for the tension plate release lever 22, previously mentioned.

The clutch 36 forms a drive between the motor 14 and the tension wheel 18 which drive continues until the motor stalls, as previously mentioned. By means to be disclosed in detail presently, the clutch 36 is then released by operation of the weld lever 28 and the brake 38 is engaged, which operates to prevent retrograde rotation of the tension wheel before the fusion operation is initiated.

As seen in FIGS. 3 and 7, the clutch 36 is resiliently urged toward its engaged position by a coil spring 60 that is backed up by the bearing 46 at one end and presses against the moveable clutch member 42 at the other end. The brake assembly 38 includes a brake disc 62 having peripheral teeth 63 (FIG. 7) that are splined in grooves 64 (FIG. 3) formed in the housing 12 so that the brake disc 62 can slide but cannot rotate. The brake disc 62 has rearwardly facing jaws 66 (FIG. 7) that can engage in notches 68 formed at the face of the driven or sliding clutch member 42. The brake disc 62 is resiliently backed up by a Belleville-type spring washer 70 and a backup washer 72 which bears against the outer race of the shaft mounting bearing 46 (FIG. 3). When the clutch member 42 is moved forward against the force of the coil spring 60 (by the weld lever 28, as will be seen), the jaws 66 on the brake member can enter the notches 68 on the clutch member 42 and since the brake member 62 is splined at 63 to the housing, this engagement prevents rotation of the driven clutch member 42. Since the driven clutch member 42 is splined at 42a, 43 to the shaft 44 that drives the tension wheel, this combination of releasing the clutch and engagement of the brake holds the tension wheel against rotation of the forces of the strap that has been tightened around the article P.

The manner in which the clutch and brake assembly just described are operated by the weld lever 28 (FIGS. 1 and 8) will be described presently.

Release lever assembly

The mounting of the tension plate 20 on the release lever 22 and the pivoting of this assembly to the housing by means of a shaft 58 has been previously described. More specifically release lever 22 includes a bent handle 80 which is secured to a hub 82 (FIG. 5) and is pivotally mounted on the aforesaid shaft 58. Projecting down from the hub 82 is an arm 84 which mounts the tension plate 20. As seen in FIG. 1, the plate 20 has a curved jaw 21 that co-operates with the tension wheel 18 for gripping the strap S during tensioning.

The tension plate 20 is resiliently urged towards the tension wheel 18 by a spring 86 anchored at one end to a post 88 on the fixed shaft support member 56 (FIGS. 1 and 5) and anchored at the other end to a post 90 (FIG. 1 secured to the handle 80 of the release lever 22. Thus depression of the release lever 22 from its normal position shifts the tension plate 20 away from the tension wheel 18, for threaading the strap and so that tension is applied to the strap at the weld jaws 24, 26 when the latter have been closed upon the strap by operation of the weld lever 28.

Weld lever

The weld lever 28 has its inner end 91 secured to the weld lever shaft 92 (FIG. 2) which shaft appears in the perspective of FIG. 8. The lever shaft 92 performs three functions, namely it releases the clutch 36, engages the brake 38 and brings the upper weld jaw 26 against the strap as backed up by the lower weld jaw 24.

Figure 10:
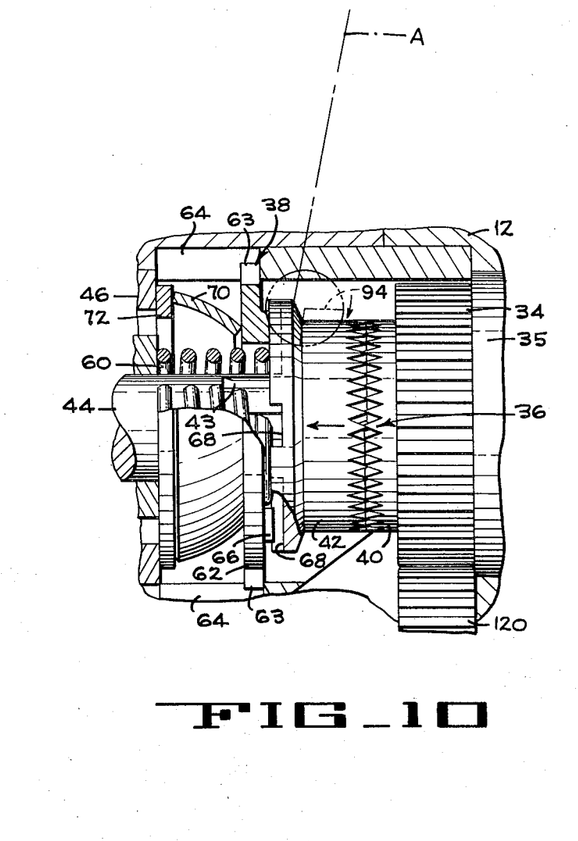
FIG. 10 is an enlarged section showing the corresponding condition of the clutch.

The clutch and brake operation, which takes place after the weld jaws are substantially but not completely closed is performed by a cam-like nose 94 on the weld lever shaft 92, FIGS. 2 and 8, which engages a rear face of the driven clutch member 42 and cams it forwardly towards the clutch disengagement position (see FIG. 10 for example). The weld lever shaft 92, the mounting which is best seen in FIG. 2, also includes an eccentric portion 96 (FIG. 8) that forces the upper jaw 26 against the strap S and the lower jaw 24. This closing action of the weld lever shaft eccentric 96 is transmitted by a plug 98 (FIG. 2) which engages an assembly of three Belleville washers 100 seated in a cup 102. The cup 102 is formed with a lower pocket 104 (FIG. 4) that slidably receives the upper end of the weld jaw 26 and rollers 106 are mounted in slots 108 in the upper edge of the weld jaw to provide an anti-friction mounting of the weld jaw in the cup 102 that accommodates oscillation of the weld jaw during the welding operation. The weld jaw is detachably assembled to the cup 102 by pins 110 (FIGS. 2 and 4) in the weld jaw that projects through side slots 114 at the pocket 104 of the cup. Springs 116 are positioned between the cup 102 and the housing 12 (FIG. 2) to normally raise and retract the weld jaw 26 from engagement with the straps. Pins 107 in the housing assist in guiding the jaw 26. Thus, manual retraction of the weld lever 28 first slides the driven clutch member 42 away from the driving clutch member 40, engages the brake and finally, due to the action of the eccentric 96 of the weld lever shaft 92 brings the upper weld jaw 26 towards the lower weld jaw for gripping the strap.

Weld jaw oscillation

As previously mentioned, after the air motor has taken up tension in the strap by driving the tension wheel 18 until it is stalled, the clutch 36 that drives the tension wheel is released by operation of the weld lever 28 and the upper welding jaw 26 closes against the strap. Upon release of the clutch, the air motor 14 resumes operation and oscillates the weld jaw 26 by mechanism best seen in FIGS. 1 and 7. The main gear 34 keyed to the air motor shaft meshes with a pinion 120 on a short shaft 122 mounted in the housing 12 in a manner illustrated in FIG. 3. Integral with the pinion shaft 122 is a bevel gear 124 which meshes with the bevel gear 126 (FIG. 7) on a cross shaft 128. The cross shaft is mounted on a main bearing 130 in the housing, as shown in FIG. 2 and the outer end of the cross shaft 128 is supported by needle bearings 132 in the housing as also seen in FIG. 2. The cross shaft 128 is formed with an eccentric 134 (FIGS. 1, 2 and 7) that fits an elongated slot 136 formed in the weld jaw 26. Thus, rotation of the cross shaft 128 through the motor gear 34, the pinion 120 and the bevel gears 124, 136 turns the eccentric 134 and oscillates the weld jaw 26 back and forth. Weld jaw 26 is provided with a knife 138 (FIG. 1) which severs the upper portion U of the strap without cutting the lower portion, and therefore detaches the article from the strap supply when the weld jaw is fully closed by operation of the weld lever 28.

This completes a detailed description of the basic mechanical parts of a welding tool embodying the present invention.

Release cam

The release cam 30, in accordance with the present invention, serves to operate the tension plate release lever 22 for preventing crease breakage during welding.

Figure 6:
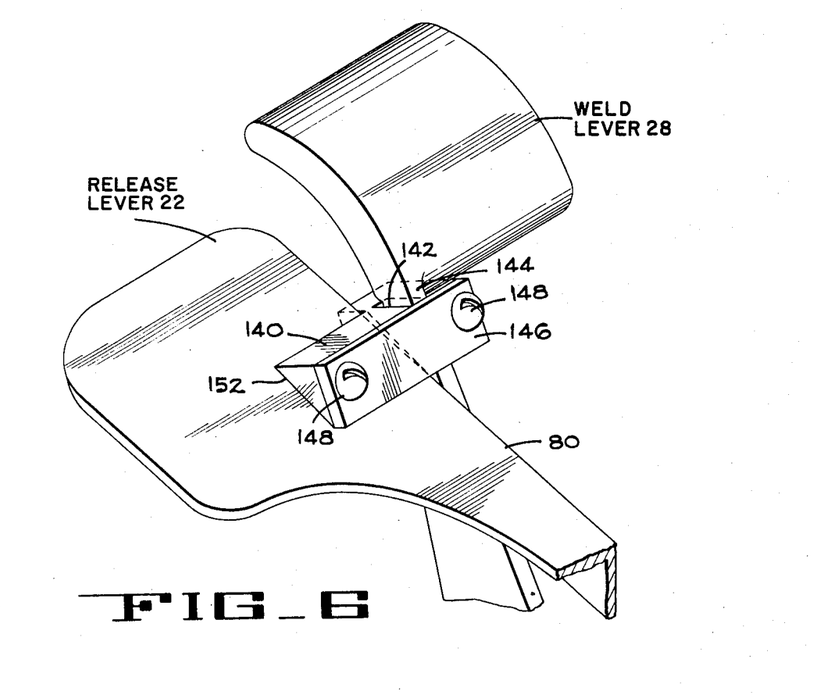
FIG. 6 is an enlarged perspective showing the weld lever release cam and the release lever.

The release cam 30 is secured near the end of the weld lever 28 for engagement with the release lever 22 in a manner to be described in detail presently. As best seen in FIG. 6, the release cam 30 has a body portion 140 that is notched at 142 to receive the shank 144 of the weld lever 28. The cam body 140 has screwed thereto a cover plate 146 that closes the mounting notch 142 in the body. Screws 148 hold the cover plate to the cam body 140. In accordance with the present invention, the release cam 30 can be adjustably secured along the weld lever shank 144 and clamped in its selected position by means of setscrews 150 shown in FIGS. 1 and 9. The body 140 of the release cam is beveled at 152 (FIG. 6) for making maximum area engagement with the shank 80 of the release lever 28 during operation of the tool.

Operation

The operation of the improved tool of the present invention will now be described in conjunction with FIGS. 1 and 9–14.

In FIG. 1, while one hand (hands not shown) is holding the motor 14 the release lever 22 will have been manually depressed and will be so held with the same hand to receive the overlapping strap portions slipped into the tool with the other hand, whereupon the release lever is released as shown in that figure. The overlapped portions of strap S are now gripped by the tension assembly. The air motor will be started to tension the strap S about the article P. With the weld lever in its forward or release position shown, the driven clutch member 42 will be engaged with the driving clutch member 40 (FIG. 3) so that when the motor 14 is started by means of the control valve 16 the tension wheel 18 is driven through the drive train previously described in detail. Rotation of the tension wheel 18 continues until the strap has been fully tensioned about the article, whereupon the air motor 14 stalls.

With the weld lever 28 in the release position of FIG. 1, the springs 116 will have retracted the weld jaw 26 from the strap, as permitted by the position of the eccentric 96 illustrated in FIG. 1.

When tensioning has been completed as indicated by stalling of the motor, the operator then initiates a weld cycle by operation of the weld lever 28. This is done by a simple continuous rearward pull on the weld lever from the position shown in FIG. 1 to the most rearward position thereof, but this motion of the weld lever has been broken into steps in order to explain the actions that take place during the cycle.

Figure 9:
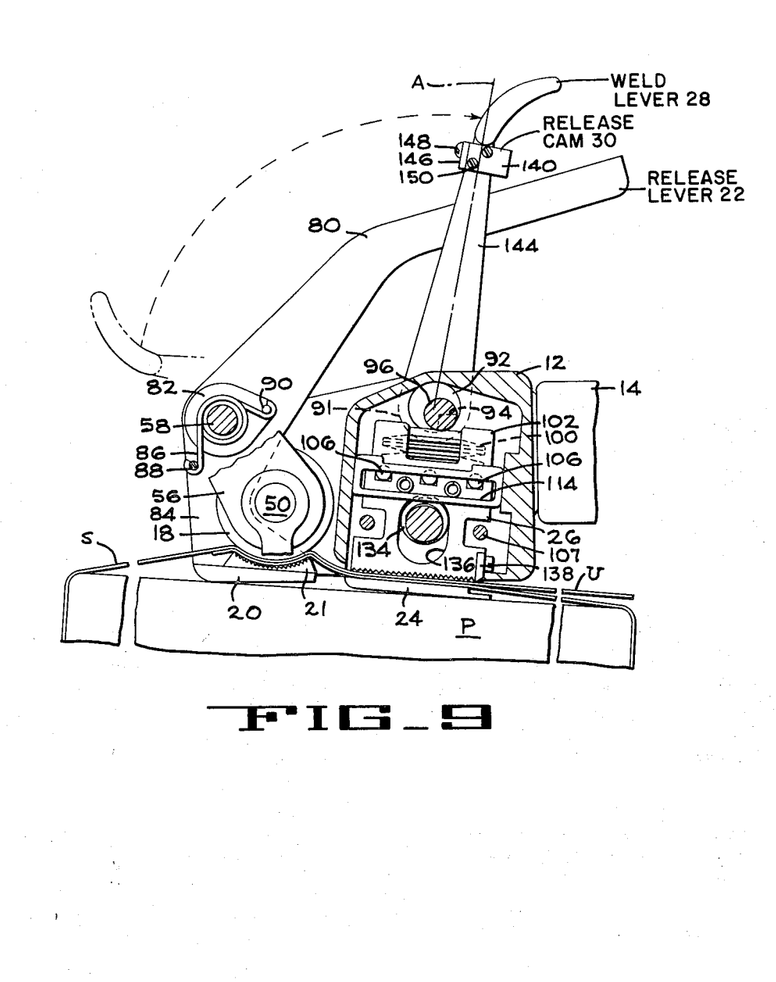
FIG. 9 is a view like FIG. 1 showing the first stage of the weld lever operation.

In FIGS. 9 and 10, and in the course of the single stroke retraction the weld lever 28, has reached a position indicated at A. The eccentric 96 on the weld lever shaft 92 has forced the upper welding jaw 26 down towards initial pressure engagement with the upper loop U of the strap S, which is the feed loop. As previously mentioned, the tension wheel 18 will have been stalled by tightening of the strap about the article P. As seen in FIG. 10, cam nose 94 (see also FIG. 8) on the weld lever shaft 92 will have engaged and shifted the driven clutch member 42 to a position where the interengaging clutch teeth on the clutch members 40 and 42 are almost but not quite disengaged. Thus, although the motor 14 may still have been stalled it is about to be released again to begin oscillation of the welding jaw 26. Furthermore, and as has been indicated in FIG. 10, the cam nose 94 on the weld lever shaft has brought the driving clutch member 42 against the brake disc 62 so that the jaws 66 of the brake disc engage the face of the clutch member 42 but at the location illustrated these jaws may or may not have entered the notches 68 (FIG. 7) in the clutch member 42. Since the motor is still stalled in the position of FIGS. 9 and 10 (but about to be released), the eccentric shaft 92 which is constantly geared to the motor 14 and is provided for oscillation of the welding jaw 26, will also be stalled and the jaw 26 will therefore not be oscillated.

Figure 11:
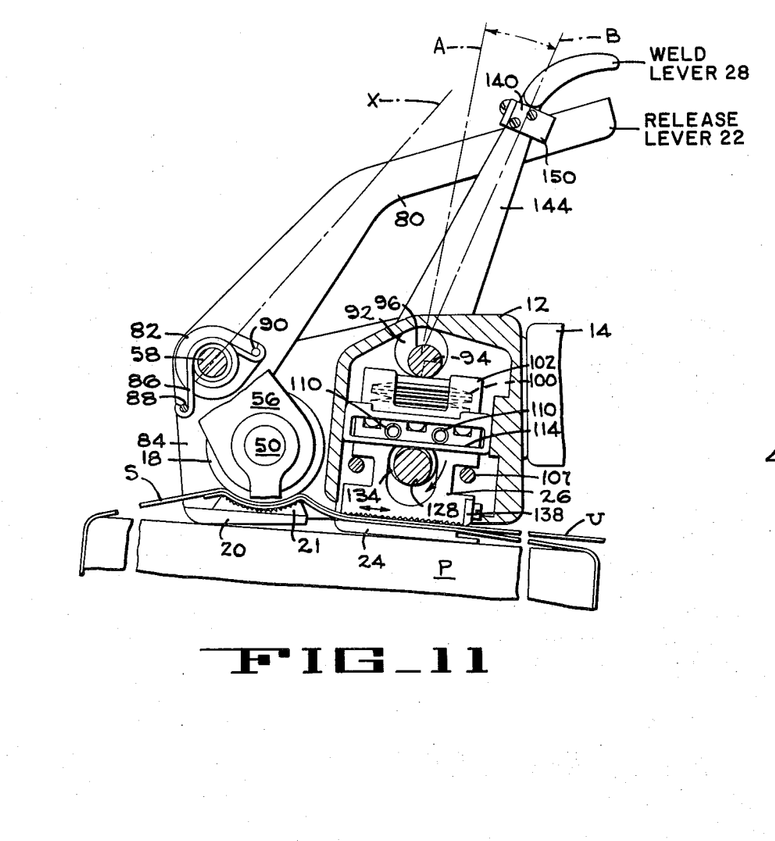
FIGS. 11 and 12 correspond to FIGS. 9 and 10 showing a second stage of weld lever operation.
Figure 12:
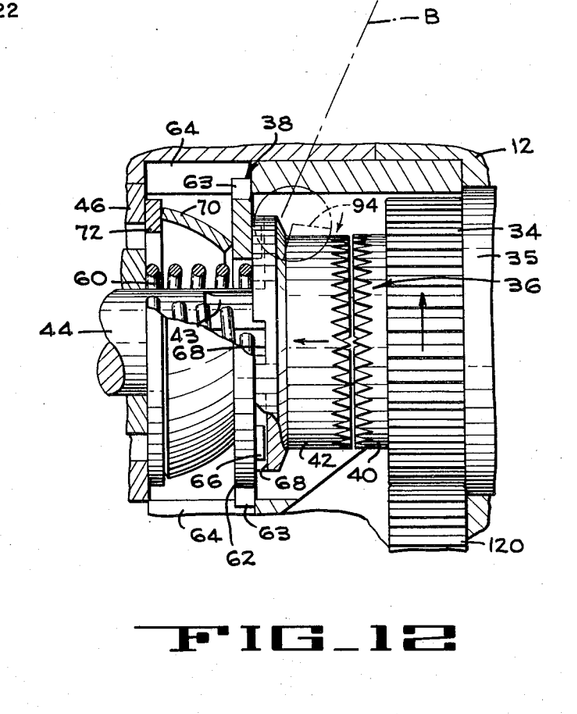

In FIGS. 11 and 12, the continuous rearward motion of the weld lever 28 has continued until the lever reaches a position B. Here the eccentric 96 on the weld lever shaft has substantially completely brought the welding jaw 26 into firm pressure engagment with the strap S as backed up by the fixed welding jaw 24. The knife 140 may be cutting into the upper feed loop U.

As seen in FIG. 12, the cam nose 94 on the weld lever shaft 92 will have still further shifted the clutch member 42 away from the driving clutch 40, whereupon the driving connection to the previously stalled tension wheel 18 is broken and the motor 14 and its constantly connected operating gear 34 begin rotating. This initiates oscillation of the weld jaw 26. Also, the lugs 66 on the brake plate 62 will be in full engagement in the notches 68 in the clutch member 42, which keys the clutch member 42 and hence the tension wheel shaft 44 to the housing 12 by means of the teeth 63 on the brake plate 62 and the notches 64 in the housing. This braking of wheel 18 (which actually occurred before the conditions of FIG. 11) prevents loosening of the strap before the welding cycle begins.

Furthermore, in FIGS. 11 and 12 and in accordance with the present invention, the release cam 30 mounted on the weld lever 28 has been brought against the release lever 22 and hence is about to initiate disengagement of the tension plate 20 from the loop at the tension wheel at substantially the very beginning of the welding cycle, for preventing crease failure.

Figure 13:
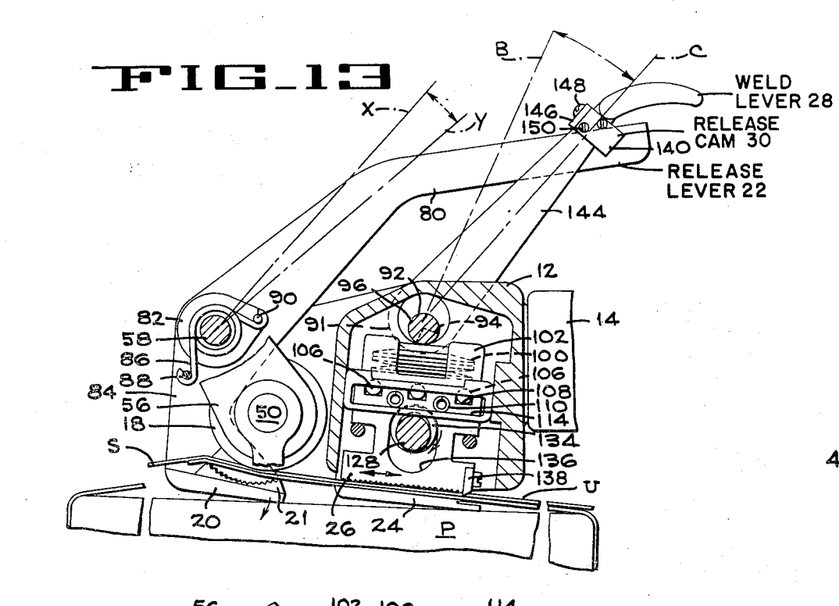
FIGS. 13 and 14 show the final stage of weld lever operation with the tool performing the weld.
Figure 14:
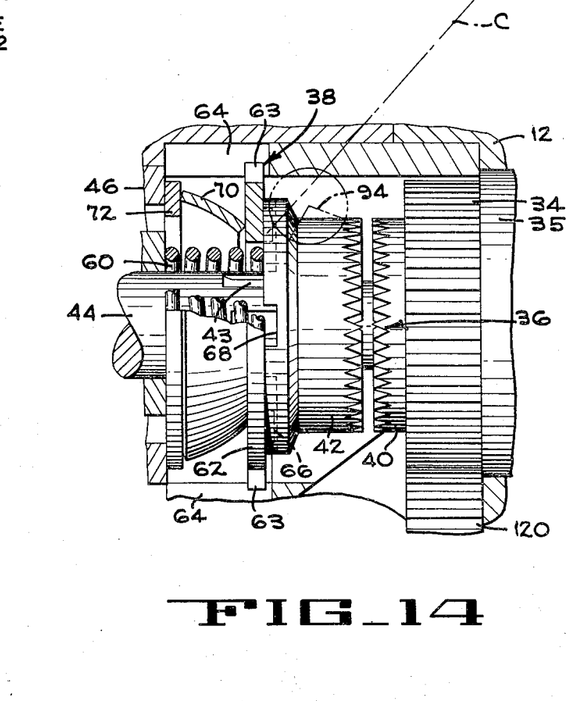

In FIGS. 13 and 14, the weld lever 28 has been moved further rearwardly to position C, and this will augment the force that the welding jaw 26 exerts against the strap. Also, as seen in FIG. 14, the weld lever shaft nose 94 will have further pressed the brake disc 62 forward against the force of the Belleville spring 70. However, the brake has previously been applied as described in connection with FIGS. 11 and 12.

The significant action that takes place at position C of the weld lever shown in FIGS. 13 and 14, is that the release cam 30 has engaged the release lever 22, and has moved it from its previous position X, wherein the tension plate 20 still gripped the strap, to a position Y, wherein the tension plate 21 clears the strap and full tension is applied to the strap loops between the welding jaw 24, 26. Oscillation of the weld jaw 26 continues to perform the welding operation. The knife 140 completely severs the upper loop U.

Figure 15:
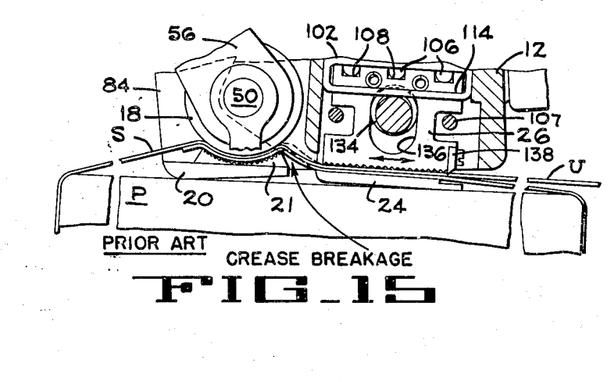
FIG. 15 provides a comparison of the prior devices wherein crease breakage occurs with the conditions shown in FIG. 13 of the present invention.

There is no trapped or confined short length of strap that is flexed during welding, as compared with the prior art tool, illustrated in FIG. 15. Thus the crease breakage characteristic of the operation of the prior tool does not occur, although the tool of the present invention (FIG. 13) will tend to oscillate as a unit during the welding cycle. This oscillation of the heavy mass tool, constrained by the operator, does not interfere with the reciprocation of the welding jaw 26 relative to the strap S, and merely results in producing the weld while the joint is under tension.

Based upon experience, when the weld is completed the air motor is stopped, the weld lever 28 is pushed forward to open the weld jaws, and the release lever 22 is depressed again to open the tension assembly. The tool can now be slipped out from between the united strap S and the article P.

As a matter of fact, the weld lever 28 will usually be brought slightly further back than position illustrated in FIGS. 13 and 14 but this has substantially no effect on the apparatus. It will be noted that retraction of the weld lever 28 is done in one simple continuous motion and if the release cam 30 is properly adjusted, the operator need not be concerned with automatic timing of the operation of the release lever 22 to release the strap at the tension mechanism at the proper time in the cycle and for the purpose described.

Experience with polypropylene strapping has shown that the welding cycle can last for as long as 8 seconds without crease breakage, although 2 seconds are adequate to provide a good joint. With the prior tool of FIG. 15, crease breakage can occur after three, or even two seconds of welding time. Thus the present invention, which permits a welding cycle of 2–8 seconds (or higher) removes the necessity for the operator to exercise instant judgments and quickly stop the welding cycle as soon as the minimum welding time has run. Thus the tool of the present invention is less sensitive to errors in operator judgment than the prior tool.

Although the best mode contemplated for carrying out the present invention has been herein shown and described, it will be apparent that modification and variation may be made without departing from what is regarded to be the subject matter of the invention.

I claim:

1. In a hand tool for joining thermoplastic strapping about an article of the type which comprises a strap tensioning assembly including a resiliently loaded strap tensioning wheel and a tension plate, a pair of relatively oscillating, normally open strap welding jaws, a motor, drive means connected to said motor for rotating said tension wheel and for reciprocating one of said jaws, a clutch for disconnecting the motor drive from said tension wheel while it remains connected to said jaw, a release lever connected for releasing said tensioning assembly from the strap, and a weld lever connected for first closing said strap welding jaws and thereupon declutching said motor from the strap tension wheel so that the motor relatively oscillates said strap welding jaws to perform the weld; the improvement comprising anti-crease means connected to said weld lever for releasing said tensioning assembly from the strap after said strap welding jaws have been closed on the strap to eliminate crease failure of the strap between said jaws and the tensioning assembly during the oscillating welding operation performed by the jaws.

2. The tool of claim 1, whereby said anti-crease means comprises a cam mounted on said weld lever and positioned to engage and operate said release lever for causing the latter to release said tensioning assembly in the manner described.

References Cited

UNITED STATES PATENTS

| 3,442,735 | 5/1969 | Stensaker | 156—73 |
| 3,554,846 | 1/1971 | Billett | 156—580 |

EDWARD G. WHITBY, Primary Examiner

U.S. Cl. X.R.

156—73, 351, 358

UNITED STATES PATENT OFFICE
CERTIFICATE OF CORRECTION

PATENT NO. : 3,799,835
DATED : CHARLES G. GILMORE
INVENTOR(S) : March 26, 1974

It is certified that error appears in the above-identified patent and that said Letters Patent are hereby corrected as shown below:

Col. 2, line 63, change "weding" to -- welding --.

Col. 3, line 74, change "10" to -- 20 --.

Signed and sealed this 15th day of July 1975.

(SEAL)
Attest:

RUTH C. MASON
Attesting Officer

C. MARSHALL DANN
Commissioner of Patents
and Trademarks